United States Patent
Ikeda et al.

(10) Patent No.: US 8,213,028 B2
(45) Date of Patent: Jul. 3, 2012

(54) IMAGE PROCESSING SYSTEM, IMAGE PROCESSING APPARATUS AND PROGRAM

(75) Inventors: Takahiro Ikeda, Tondabayashi (JP);
Tomonari Yoshimura, Kyoto (JP);
Masakazu Murakami, Itami (JP);
Mitsuzo Iwaki, Osaka (JP); Okihisa Yoshida, Amagasaki (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 1284 days.

(21) Appl. No.: 11/905,616

(22) Filed: Oct. 2, 2007

(65) Prior Publication Data

US 2008/0088867 A1 Apr. 17, 2008

(30) Foreign Application Priority Data

Oct. 11, 2006 (JP) ................................. 2006-277266

(51) Int. Cl.
*G06K 1/00* (2006.01)
(52) U.S. Cl. ..................................... 358/1.13; 358/1.15
(58) Field of Classification Search ............... 358/1.15, 358/1.13, 1.1
See application file for complete search history.

(56) References Cited

U.S. PATENT DOCUMENTS

| 6,944,790 B2 * | 9/2005 | Hamilton et al. ............ 714/6.31 |
| 6,975,415 B2 * | 12/2005 | Yamade ....................... 358/1.13 |

FOREIGN PATENT DOCUMENTS

| JP | 2001-260492 A | 9/2001 |
| JP | 2002-202921 A | 7/2002 |
| JP | 2004-526257 A | 8/2004 |

* cited by examiner

*Primary Examiner* — King Poon
*Assistant Examiner* — Iriana Cruz
(74) *Attorney, Agent, or Firm* — Buchanan Ingersoll & Rooney PC (57) ABSTRACT

An image processing system and a software program which simplify customizations when a program for operations in connection with image processing is installed in a plural number of image processing apparatuses. When a program for operations in connection with image processing is newly installed in a first MFP, the first MFP makes an inquiry to other MFPs which are connected to the first MFP via a network. When a second MFP is already installed with the same program and has information on individual users' settings for the program, the first MFP receives the setting information from the second MFP. Then, referring to history information and device information, the first MFP judges whether to store the setting information therein and whether to make modifications to the setting information.

10 Claims, 12 Drawing Sheets

| DATE | TIME | USER ID | JOB | DEVICE | DETAILS |
|---|---|---|---|---|---|
| 2006/03/15 | 09:01:12 | DAVID | SCANNING | Bluetooth | 200dpi |
| 2006/03/15 | 09:10:06 | JULIE | FAX | — | 0661234567 |
| 2006/03/15 | 09:11:35 | MICHAEL | PRINTING | FINISHER | PUNCHING |
| 2006/03/15 | 09:17:23 | ELTON | FILE TRANSFER | MFP102:Bluetooth | /ELTON/scan060311.txt |
| ... | ... | ... | ... | ... | ... |

F I G. 5

| FUNCTION | MFP101 | MFP102 | MFP103 |
|---|---|---|---|
| HDD | 200G | 80G | 80G |
| RAM | 2G | 1G | 1G |
| DUPLEX COPYING | YES | YES | YES |
| STAPLING | YES | YES | YES |
| PUNCHING | YES | YES | YES |
| FAX | YES | YES | YES |
| USB I/F | NO | YES | YES |
| SD DRIVE | NO | NO | NO |
| CF DRIVE | NO | NO | NO |
| Bluetooth I/F | YES | NO | YES |
| INFRARED COMMUNICATION I/F | NO | NO | NO |
| FINGERPRINT AUTHENTICATION | NO | NO | NO |
| IC CARD READER | YES | YES | YES |
| ... | ... | ... | ... |

```
<Macro>
Name: Macro-1
User: DAVID
Obj: MFP102
Disp: STORE TEXT FILE IN BOX & USB
Action:
   Scan =set dpi 200=
   OCR =1v14=
   Make File =set text=
   Send//MFP102/DAVID
   Send//USB
</end>
```

```
<Macro>
Name: Macro-1-M1
User: DAVID
Obj: MFP101
Disp: STORE TEXT FILE IN BOX & Bluetooth
Action:
   Scan =set dpi 200=
   OCR =1v14=
   Make File =set text=
   Send//MFP102/DAVID
   Send//Bluetooth
</end>
```

```
<Macro>
Name: Macro-1-M2
User: DAVID
Obj: MFP103
Disp: STORE TEXT FILE IN BOX, USB & Bluetooth
Action:
   Scan =set dpi 200=
   OCR =1v14=
   Make File =set text=
   Send//MFP102/DAVID
   Send//USB
   Send//Bluetooth
</end>
```

IMAGE PROCESSING SYSTEM, IMAGE PROCESSING APPARATUS AND PROGRAM

This application is based on Japanese application No. 2006-277266 filed on Oct. 11, 2006, the content of which is incorporated herewith by reference.

BACKGROUND OF THE INVENTION

1. Field of the Invention

The present invention relates to an image processing system, an image processing apparatus and a program.

2. Description of Related Art

Recently, it is suggested that an image processing apparatus provided with a virtual machine JAVA (registered trademark) be installed with a program for operations in connection with image processing so that the image processing apparatus can carry out various functions.

JP2004-526257A discloses that data on users' circumstances are collected from an old work station by use of a data collecting program and that the data are copied and stored in a new work station. JP2002-202921A discloses that data on settings are stored in a data terminal so that settings in an old copying machine can be reproduced in a new copying machine. JP2001-260492A discloses that a printer driver detects optional functions of printers and prohibits a user from making settings which a selected printer cannot perform.

After such a program for operations in connection with image processing is installed, customizations, such as settings for user interface (UI) and other settings, may be carried out. When a plural number of image processing apparatuses are installed with a program for operations in connection with image processing, customizations, such as UI settings, etc., must be carried out in the individual apparatuses, which is inconvenient.

SUMMARY OF THE INVENTION

The present invention has been made in view of the inconvenience above. An object of the present invention is to provide an image processing system, an image processing apparatus and a program which simplify customizations when a plural number of apparatuses are installed with a program for operations in connection with image processing.

A first aspect of the present invention relates to an image processing system comprising a first image processing apparatus and a second image processing apparatus connected via a network, and the image processing system comprises: a detecting section for detecting a program for operations in connection with image processing newly installed in the first image processing apparatus; an inquiry section for, when the detecting section detects a program for operations in connection with image processing newly installed in the first image processing apparatus, inquiring of the second image processing apparatus about whether the second image processing apparatus has the same program installed therein before; and a setting information transmission section for, when the second image processing apparatus has the same program installed therein before, transmitting information on individual users' settings for the program from the second image processing apparatus to the first image processing apparatus.

A second aspect of the present invention provides an image processing apparatus comprising: a detecting section for detecting a program for operations in connection with image processing newly installed in said image processing apparatus; an inquiry section for, when the detecting section detects a program for operations in connection with image processing newly installed in said image processing apparatus, inquiring of other image processing apparatuses connected to said image processing apparatus via a network about whether any of the image processing apparatuses connected to said image processing apparatus via the network has the same program installed therein before; and a setting information receiving section for, when a second image processing apparatus has the same program installed therein before, receiving information on individual users' settings for the program from the second image processing apparatus.

According to the second aspect of the present invention, when a program for operations in connection with image processing is newly installed in an image processing apparatus, another image processing apparatus which is connected to said image processing apparatus via a network and which has the same program installed before sends information on individual users' settings for the program to said image processing apparatus which is newly installed with the program. Thereby, customizations of the program can be simplified.

The "program for operations in connection with image processing" includes image processing programs but is not limited to such a program. The present invention is applicable to any program which can be carried out in an image processing apparatus and which permits individual users for any settings. The program for operations in connection with image processing may be a JAVA (registered trademark) application operated in a JAVA (registered trademark) virtual machine.

When the setting information receiving section is of a structure which receives information on settings of only users which have ever operated the image processing apparatus, the volume of transmitted data can be reduced.

Specifically, the image processing apparatus may further comprise a history storage section stored with history information on users' operations of the image processing apparatus, and the setting information receiving section may receive information on settings of users which have ever operated the image processing apparatus with reference to the history information.

Also, the image processing apparatus may further comprise: a device information receiving section for receiving information on functions of said image processing apparatus and functions of the second image processing apparatus; and a judging section for judging from the information received by the device information receiving section whether there is a functional difference between said image processing apparatus and the second image processing apparatus.

In the image processing apparatus, the setting information receiving section may receive information on settings of only a user which logs in the image processing apparatus.

The image processing apparatus may further comprise a modifying section for, when the judging section judges that there is a functional difference, making a modification to the information on users' settings with reference to the device information.

The image processing apparatus may further comprise a modification presenting section for presenting the modification made by the modifying section to a user.

The image processing apparatus may further comprise: an input receiving section for receiving an input from the user whether the modification made by the modifying section is to be saved; and a modified setting information storage section for, when the input receiving section receives an input to command saving of the modification, storing the modified information therein.

A third aspect of the present invention provides a software program stored on a computer readable medium to be installed in an image processing apparatus with a processor, and the software program causes the processor to execute processing comprising: a step of detecting a program for operations in connection with image processing newly installed in said image processing apparatus; a step of, when it is detected in the detecting step that a program for operations in connection with image processing is newly installed in said image processing apparatus, inquiring of other image processing apparatuses connected to said image processing apparatus via a network about whether any of the image processing apparatuses connected to said image processing apparatus via the network has the same program installed therein before; and a step of, when a second image processing apparatus has the same program installed therein before, requiring the second image processing apparatus for information on individual users' settings for the program.

The image processing system, the image processing apparatus and the program according to the present invention simplify customizations when a plural number of image processing apparatuses are installed with a program for operations in connection with image processing.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Figure 1:
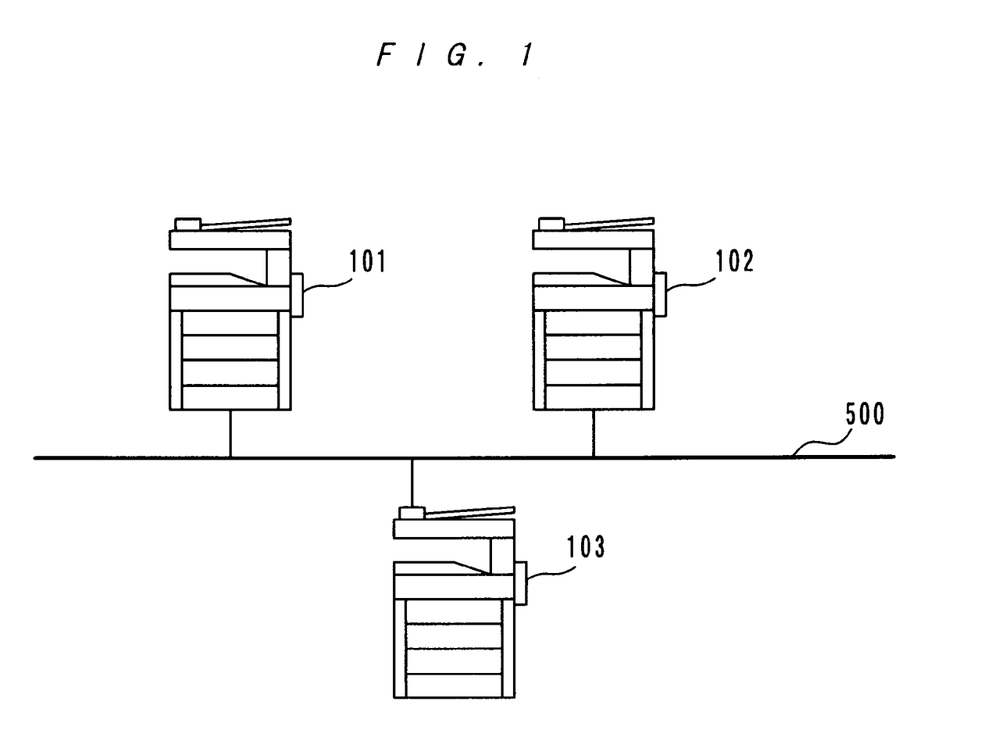
FIG. 1 is a schematic view showing an exemplary general structure of an image processing system according to the present invention.

Preferred embodiments of the present invention are hereinafter described with reference to the accompanying drawings. In the embodiments, an MFP (multi-function peripheral) is used as the image processing apparatus.
(1) Structure of Image Processing System FIG. 1 is a schematic view showing an exemplary structure of an image processing system according to the present invention. In the image processing system, three MFPs, namely, an MFP 101, an MFP 102 and an MFP 103 are connected to one another via a network 500 such as a LAN. There may be any number of MFPs in the system.

The following description is about a case of newly installing a program for operations in connection with image processing, for example, an OCR (optical character recognition) program in the MFP 101 while the MFP 102 is already installed with the same program.
(2) Structure of MFP Now, the structure of an MFP is described. In this embodiment, the MFPs 101 to 103 are basically of the same hardware structure except having different external connection interface (USB, infrared communication, Bluetooth, etc.). In the following, the MFP 101 is described as an example.

Figure 2:
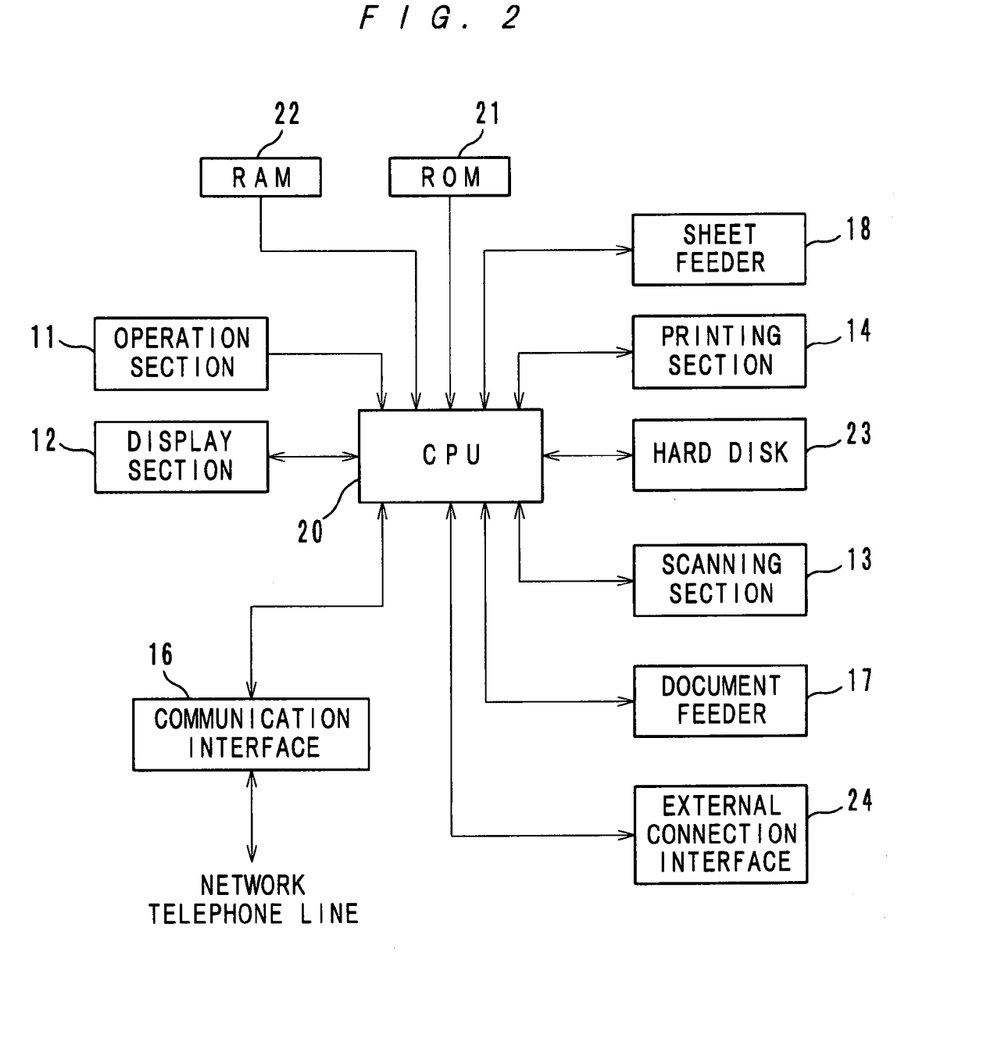
FIG. 2 is a block diagram showing an exemplary hardware structure of an MFP.

FIG. 2 shows an exemplary hardware structure of the MFP 101. The MFP 101 comprises an operation section 11, a display section 12, a scanning section 13, a printing section 14, a communication interface 16, a document feeder 17, a sheet feeder 18, a CPU 20, a ROM 21, a RAM 22, a hard disk 23, an external connection interface, etc.

The operation section 11 comprises a plural number of keys for inputs of numbers, letters and symbols, a sensor for detecting a key pressed and a circuit for sending a signal showing the pressed key to the CPU 20.

The display section 12 displays screens for presenting information to a user, screens for promoting a user to input for settings and processing, screens for showing the results of processing performed by the MFP 101, etc. In this embodiment, the display section 12 comprises a touch panel, and the touch panel also belongs to the operation section 11. The touch panel detects what area on the touch panel the user touched and sends a signal showing the result of the detection to the CPU 20.

The scanning section 13 reads an image drawn on a document at a specified resolution by irradiating the document and reading the reflected light. Then, the scanning section 13 generates digital image data (here, density data in RGB or in black). The image data are used for printing at the printing section 14. Also, the image data are transformed into various formats, such as TIFF, PDF, JPEG, etc., and are stored in the hard disk 23. The image data may be transformed into facsimile data and sent by facsimile. The document feeder 17 is located, for example, on the top of the body of the MFP 101 and is used for feeding one or more documents sequentially to the scanning section 13.

The printing section 14 prints out data onto recording sheets of, for example, paper or film. The printed data are data read by the scanning section 13, data sent from an exterior device (e.g. a personal computer) via the network (e.g. a LAN) 500 or facsimile data received by facsimile. The sheet feeder 18 is located, for example, in a lower section of the body of the MFP 101 and feeds recording sheets to the printing section 14. Printed sheets, that is, recording sheets which obtained images thereon at the printing section 14, are ejected on a sheet tray (not shown).

The communication interface 16 is an interface for communications with exterior devices, such as other MFPs, personal computers, etc., via the network 500 and for facsimile sending/receiving via a telephone line. As the communication interface 16, for example, a NIC (network interface card), a modem, a TA (terminal adapter), etc. can be used.

The ROM 21 is stored with programs and data for carrying out the fundamental functions of the MFP 101, such as a function as a scanner, a function as a copying machine, a function as a facsimile, a function as a network printer, a function as a document server (box function), etc. Further, the ROM 21 is stored with a program and data for a function according to the present invention as described below. All or part of the programs and the data may be stored in the hard disk 23. In this case, the programs and the data stored in the hard disk 23 are loaded to the RAM 22 when they are used. The function according to this embodiment is not necessarily carried out by the CPU 20 and may be carried out by using a hardware for exclusive use or by partly using a function of a general-purpose program such as an operating system (OS).

Figure 3:
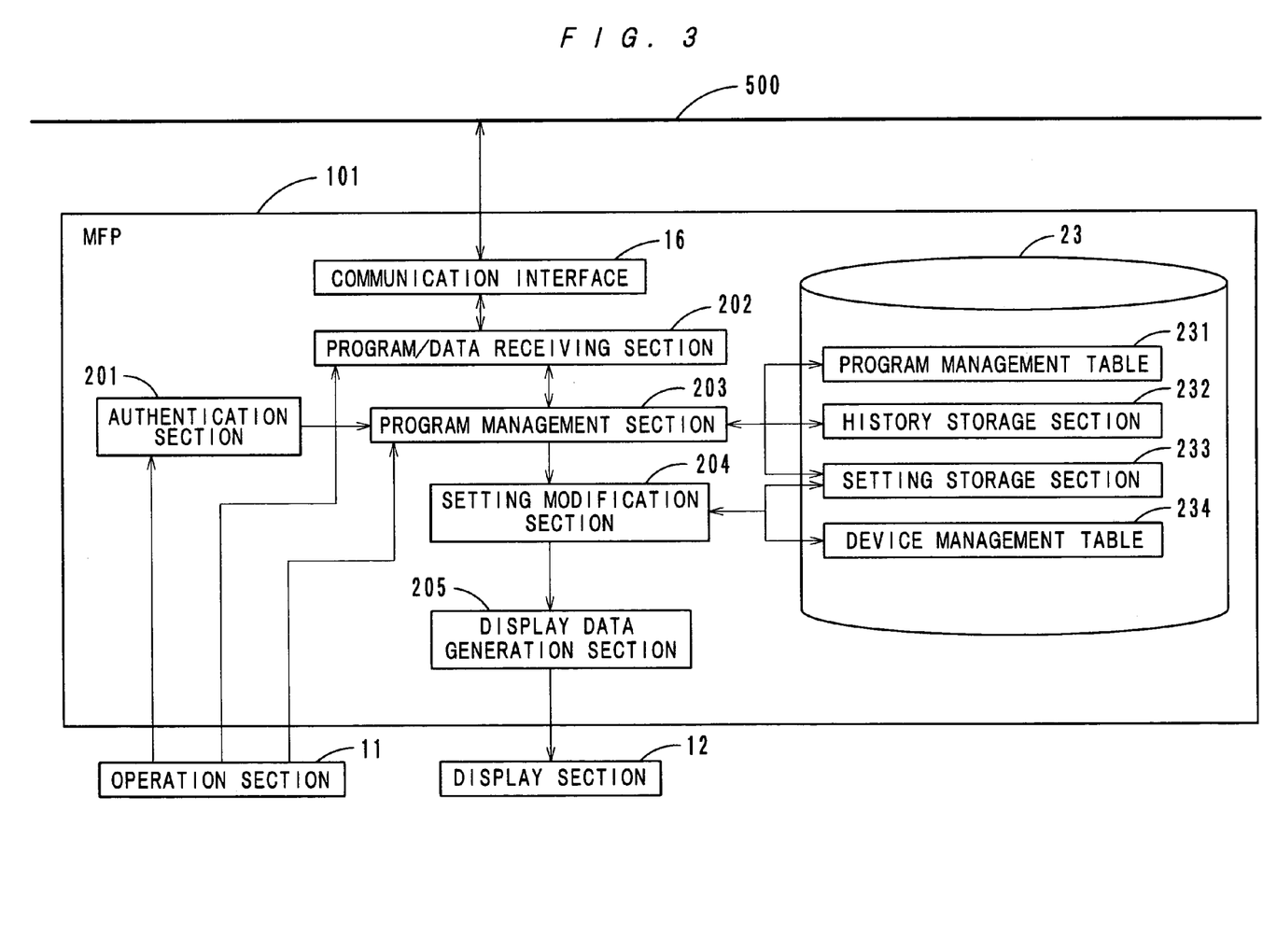
FIG. 3 is a block diagram showing an exemplary functional structure of an MFP according to the present invention.

FIG. 3 is a block diagram showing an exemplary functional structure of the MFP 101. The MFP 101 comprises an authentication section 201, a program/data receiving section 202, a program management section 203, a setting modification section 204 and a display data generation section 205. These sections operate when the CPU 20 starts a program stored in the ROM 21.

The authentication section 201 judges from a user ID and a password inputted by a user via the operation section 11 whether to permit the user to log in. The user authentication may be performed by an external authentication server.

The program/data receiving section 202 downloads programs for operations in connection with image processing from outside and receives information on individual users' settings from other MFPs. The program management section 203 manages programs installed in the MFP 101, the information on individual users' settings and history information on users' operations of the MFP 101.

The setting modification section 204 makes modifications to the information on individual users' settings received from other MFPs, if necessary. The display data generation section 205 generates data and commands the display section 12 to display the data.

In the hard disk 23, a program management table 231, a history storage section 232, a setting storage section 233 and a device management table 234 are made. The program management table 231 is to manage the programs for operations in connection with image processing installed in the MFP 101.

Figure 4:
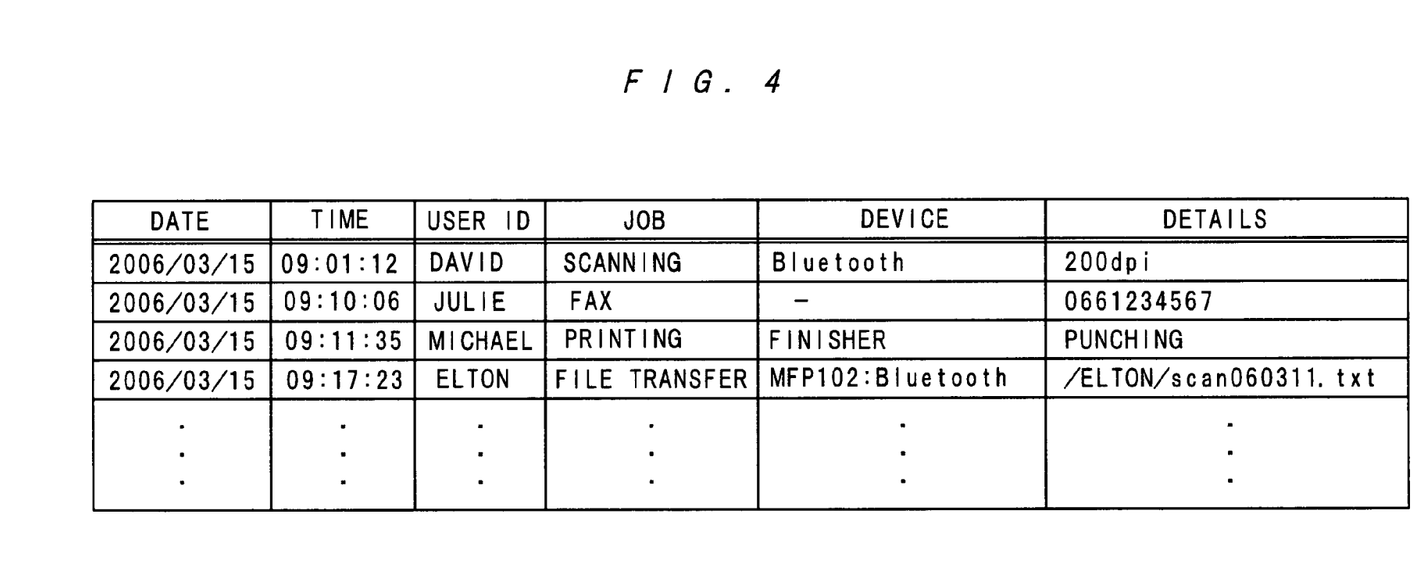
FIG. 4 is a table showing an example of history information stored in a history storage region.

The history storage section 232 is stored with history information on users' operations of the MFP 101. FIG. 4 shows exemplary information stored in the history storage section 232. In this embodiment, the date and time of operation, the user ID, the kind of job, the device and other details are stored in the history storage section 232.

The content recorded in the item of device and the content recorded in the item of details depend on the kind of job. For example, when the kind of job is scanning, the device to be stored with data obtained by scanning at the scanning section 13 may be recorded as the device, and a resolution may be recorded in the item of details. When the device to be stored with the data is the hard disk 23, further, a file name may be recorded in the item of details.

When the kind of job is facsimile sending, a facsimile number of the receiver may be recorded in the item of details. According to FIG. 4, the user Michael performed printing and thereafter punching of printed sheets by use of a finisher, and a note showing that punching has been performed is written in the item of details. When the kind of job is file transfer, the device which has received the file transfer may be recorded in the item of device, and a file name of the sender may be recorded in the item of details. However, the history information is not limited to the example shown by FIG. 4.

In the setting storage section 233, information on individual users' settings for the installed programs is stored. As the setting information, for example, each user's settings for user interface in carrying out a program in the MFP 101 may be stored, and further, macro instructions generated or recorded by users may be stored.

Figure 5:
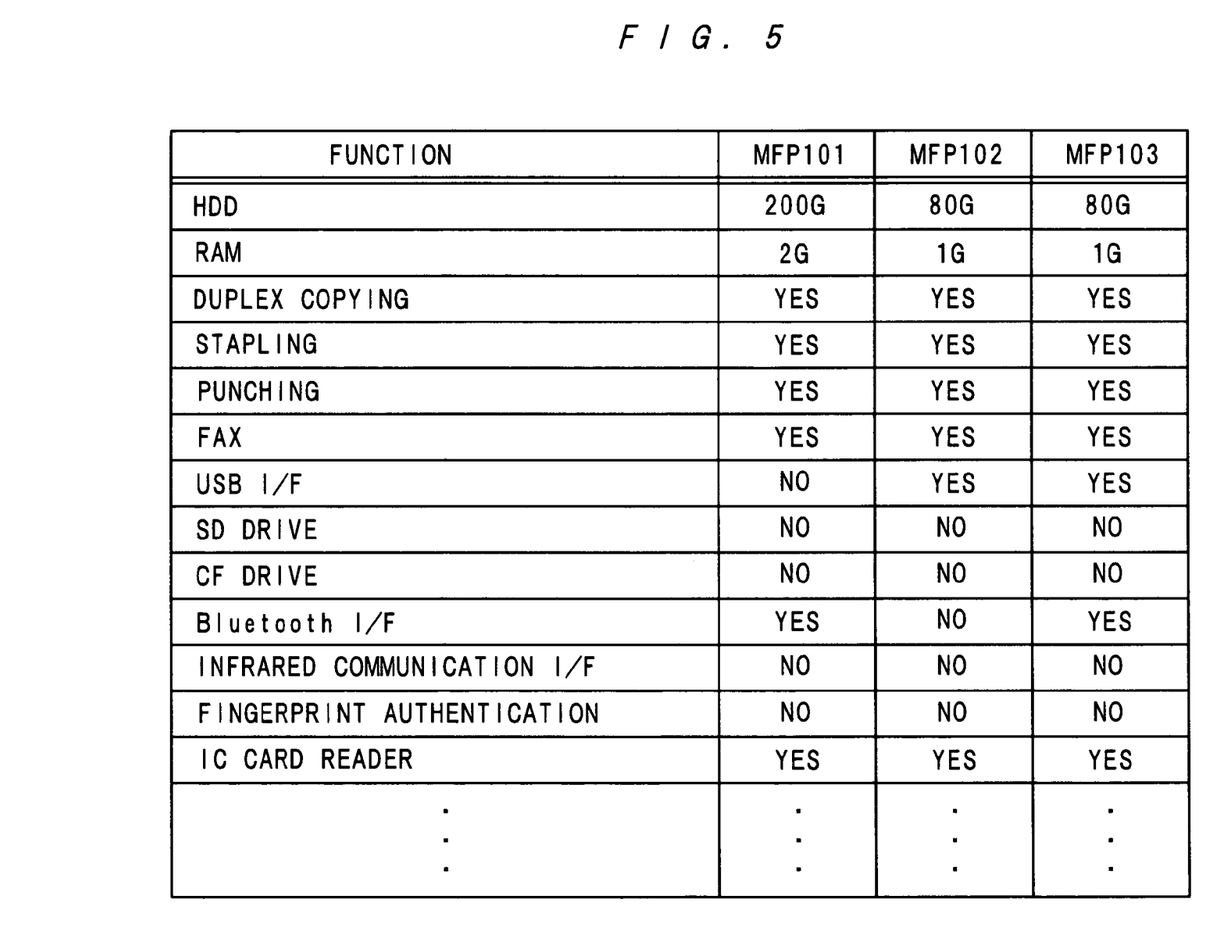
FIG. 5 is a table showing an example of device information stored in a device management table.

In the device management table 234, information on the functions of the MFP 101 and the functions of other MFPs are stored. FIG. 5 shows exemplary information stored in the device management table 234. In the example shown by FIG. 5, in connection with each of the MFPs 101 to 103, the capacity of the hard disk, the capacity of the RAM, availability of duplex printing, availability of punching and stapling, the kinds of external connection interfaces, etc. are stored.

(3) Processing of MFP 101

Figure 6:
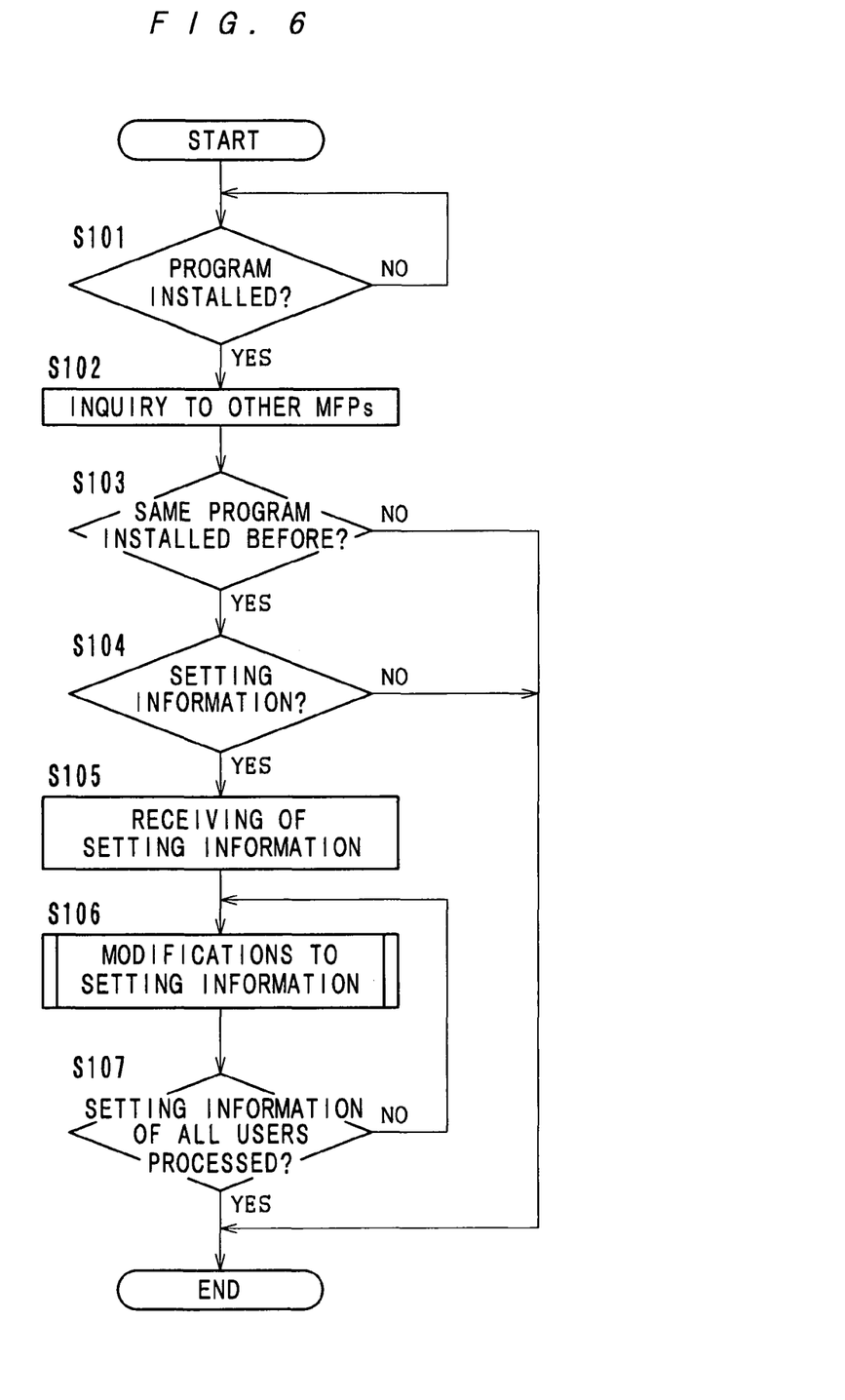
FIG. 6 is a flowchart showing an exemplary procedure carried out by the MFP.

Next, processing of the MFP 101 is described. FIG. 6 is a flowchart showing an exemplary procedure carried out by the MFP 101. The procedure is carried out when the CPU 20 starts a program stored in the ROM 21.

When the MFP 101 detects a program for operations in connection with image processing newly installed therein (YES at step S101), the MFP 101 inquires of the other MFPs whether any of the other MFPs has the same program installed therein before and information on individual users' settings for the program (step S102). This inquiry can be made via a broadcast packet. Each of the MFPs which received the inquiry replies as to whether having the program therein and as to whether having information on users' settings for the program.

When there are no other MFPs which have the same program installed therein before (NO at step S103), the processing skips the following steps. Also, even if there are any other MFPs which have the same program installed therein before (YES at step S103), when none of the MFPs has information on users' settings for the program (NO at step S104), the processing skips the following steps.

If at least one of the other MFPs has setting information for the program (YES at step S104), the MFP 101 receives the information (step S105). Then, the MFP 101 makes modifications to the setting information (step S106). The MFPs may have different functions as shown by FIG. 5, and the MFP 101 may not carry out the program under the settings as they are shown by the setting information. Therefore, the settings for the program are adapted for the MFP 101 in the setting modification section 204.

Figure 7:
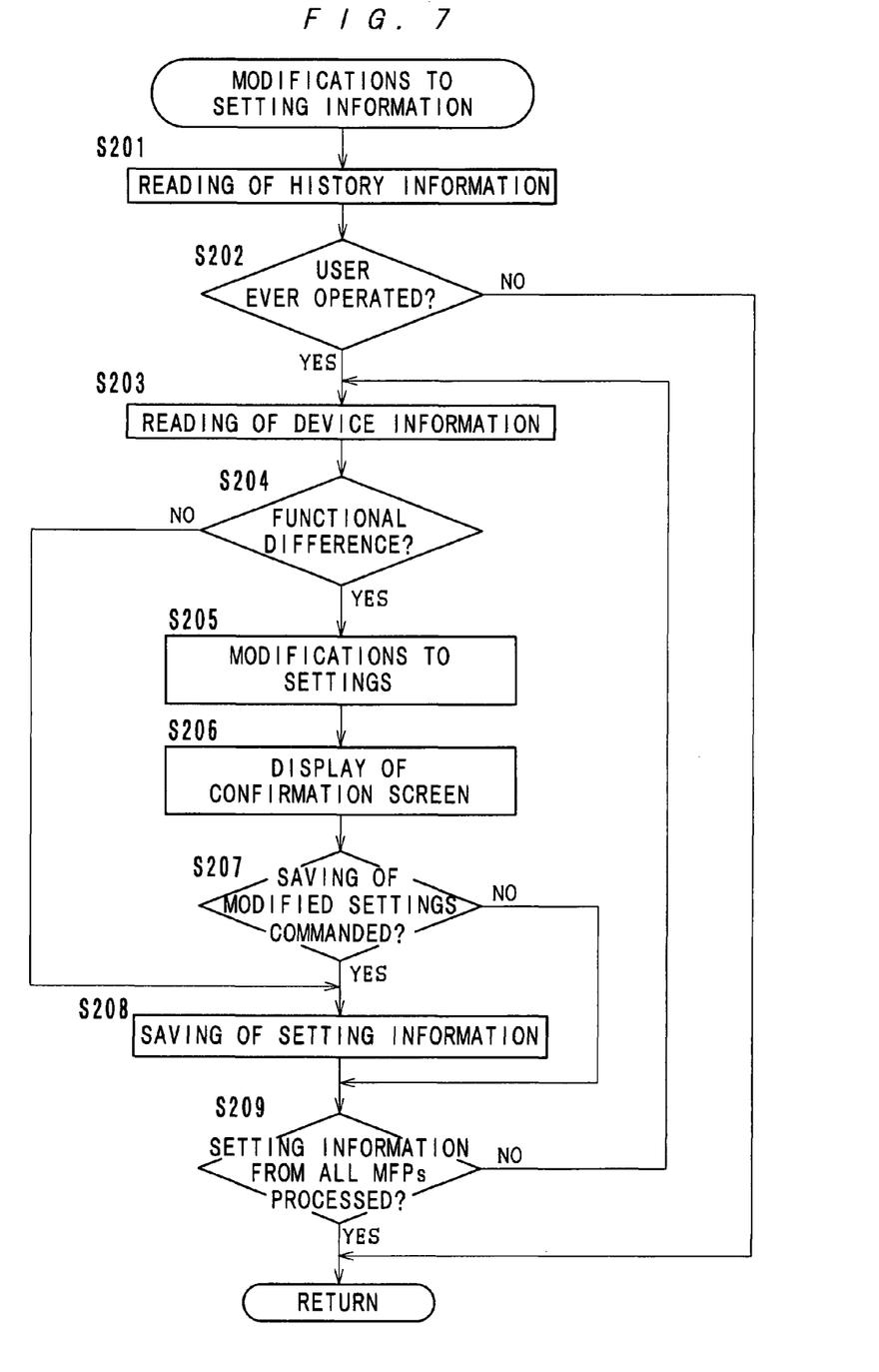
FIG. 7 is a flowchart showing an exemplary procedure for making modifications to a user's setting.

Now, the modifications to the setting information are described. FIG. 7 is a flowchart showing a procedure for modifying the setting information. In this procedure, first, the information stored in the history storage section 232 is read out (step S201), and it is judged whether a user listed in the setting information has ever operated the MFP 101 before (step S202).

In this embodiment, in connection with setting information of a user which has never operated the MFP 101 (NO at step S202), the processing immediately returns to the flowchart shown by FIG. 6. Then, in FIG. 6, the processing goes to modifications to settings of a next user (NO at step S107). With this arrangement, setting information of users which have never operated the MFP 101 is not stored in the MFP 101, and thereby, the memory of the hard disk can be saved. However, setting information of users which have never operated the MFP 101 may be also stored in the MFP 101.

Figure 8:
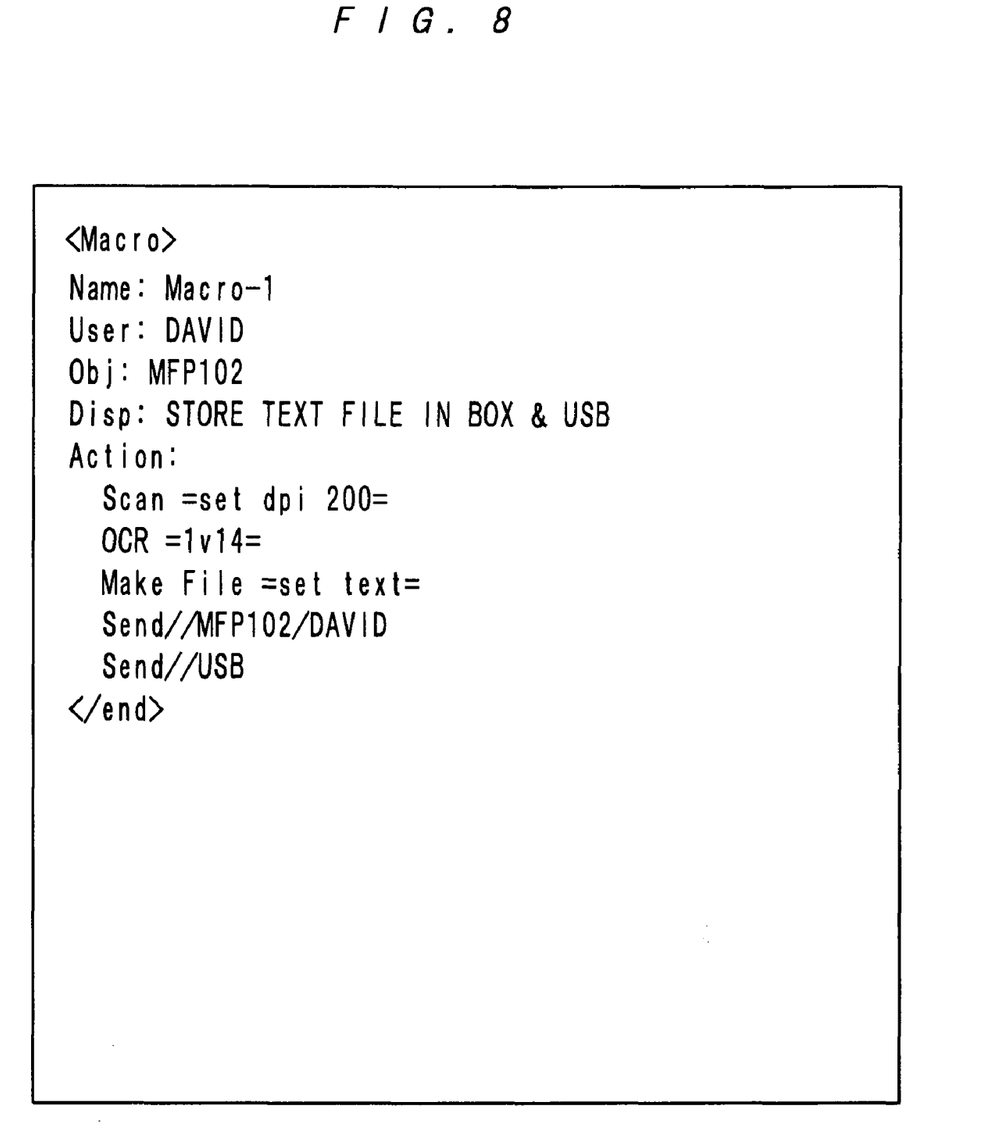
FIG. 8 is an illustration of a macro instruction as an example of setting information.

In this embodiment, when the user has ever operated the MFP 101 (YES at step S202), the device management table 234 is read out (step S203), and it is judged whether there are any functional differences among the MFPs (step S204). The following describes a case wherein each user's setting information is a macro instruction of an OCR program. FIG. 8 shows an example of the macro instruction.

The macro instruction shown by FIG. 8 is stored in the MFP 102. According to the macro instruction, the MFP 102 is instructed to start the OCR program, to extract text data from an image file obtained by scanning and to store a text file in a box (data storage region) made in the hard disk of the MFP 102 and in a device connected to the USB interface.

Figure 9:
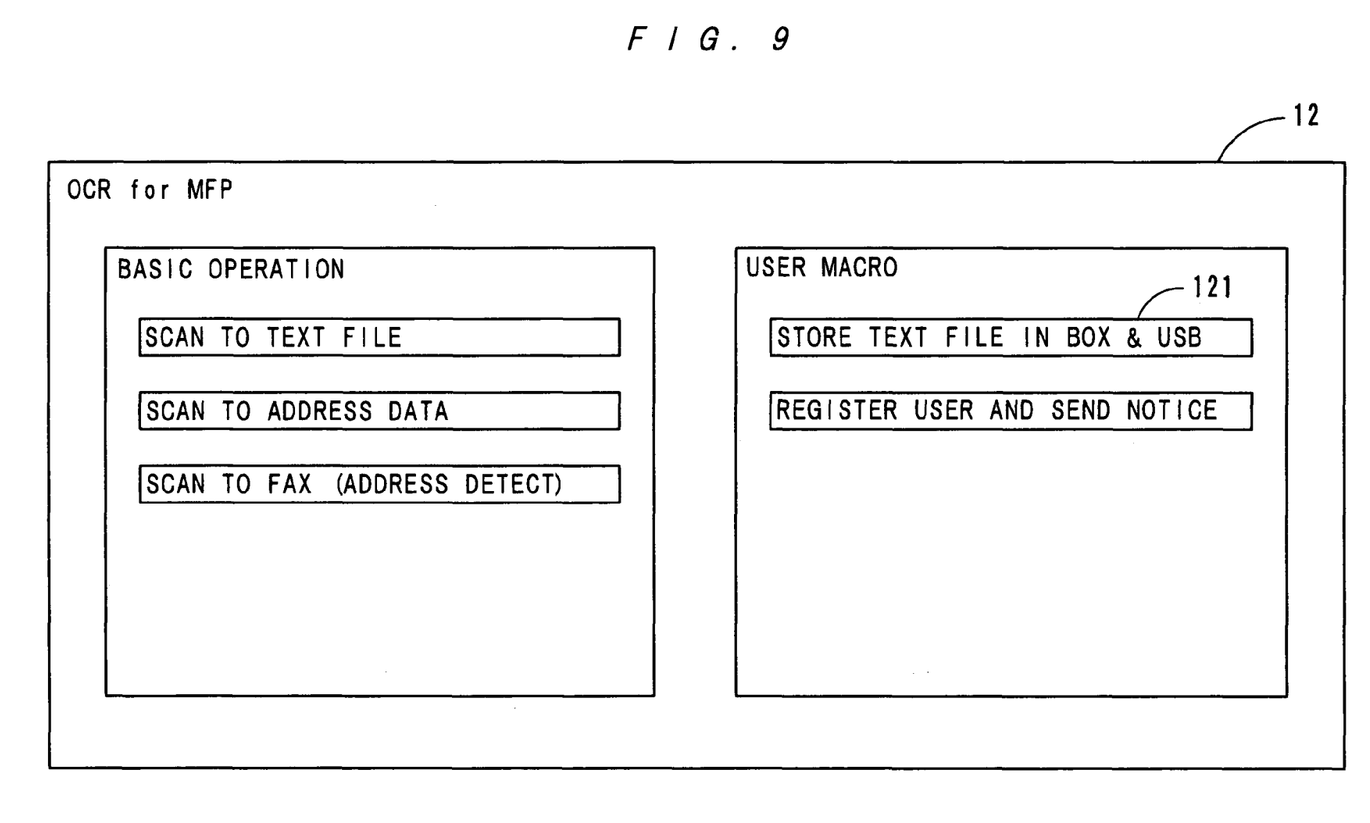
FIG. 9 is an illustration of an exemplary display of the settings made by the macro instruction.

The item "Disp" in FIG. 8 shows words to be displayed as the headline of the macro instruction when the macro instruction is displayed on the display section 12. FIG. 9 is an example of the display of the macro instruction. In a section 121, "STORE TEXT FILE IN BOX & USB", which is recorded in the item "Disp" in FIG. 8, is displayed.

According to the history information shown by FIG. 4, the user "David", for which the macro instruction shown by FIG. 8 is, has ever operated the MFP 101. Further, according to FIG. 5, there are functional differences between the device which sent the setting information (MFP 102) and the device newly installed with the program (MFP 101). Therefore, at step S205 in FIG. 7, modifications must be made to the user's settings.

Figure 10:
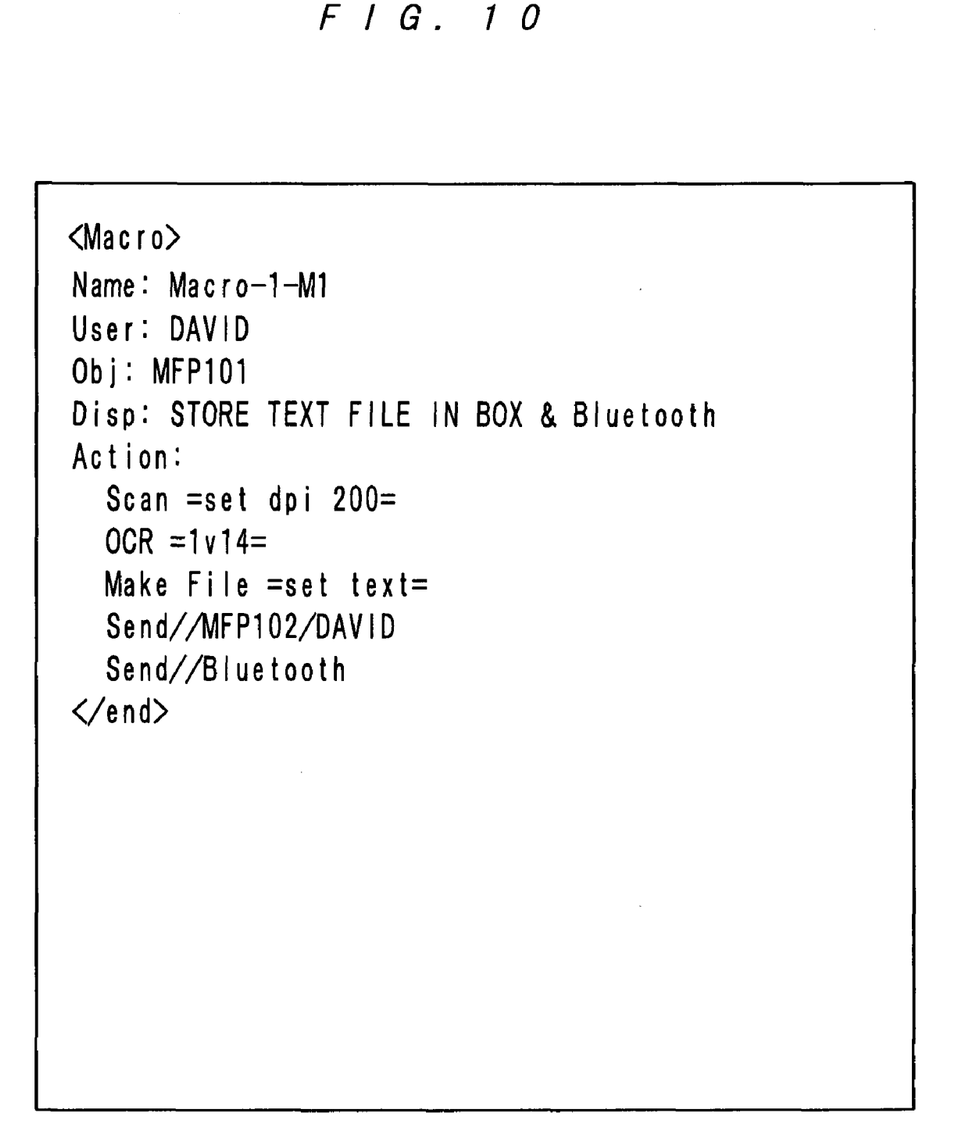
FIG. 10 is an illustration of a macro instruction with exemplary modifications made thereto.

In this embodiment, as shown by FIG. 5, the MFP 102 has a USB interface, while the MFP 101 does not have a USB interface but has a Bluetooth interface. The setting modification section 204 makes modifications to the macro instruction shown by FIG. 8 with reference to the device information. FIG. 10 is an example of the modified macro instruction.

In this example, the object of operation is changed from MFP 102 to MFP 101, and with reference to the device information, in the item "Action", "Send//USB" is changed to "Send//Bluetooth". Also, in the item "Disp", the words to be displayed are changed to "STORE TEXT FILE IN BOX & Bluetooth". In this example, no change is made to the box stored with data, that is, in the item "Action", "Send//MFP102/DAVID" is left unchanged, and therefore, the data are stored in the box for David made in the hard disk of the MFP 102. However, this part may be changed so that the data will be stored in a box made in the hard disk of the MFP 101. For example, the device information includes information as to which users have their private boxes in which devices, and when there is a box for David in the MFP 101, this part of the macro instruction may be changed from "Send//MFP102/DAVID" to "Send//MFP101/DAVID".

Figure 11:
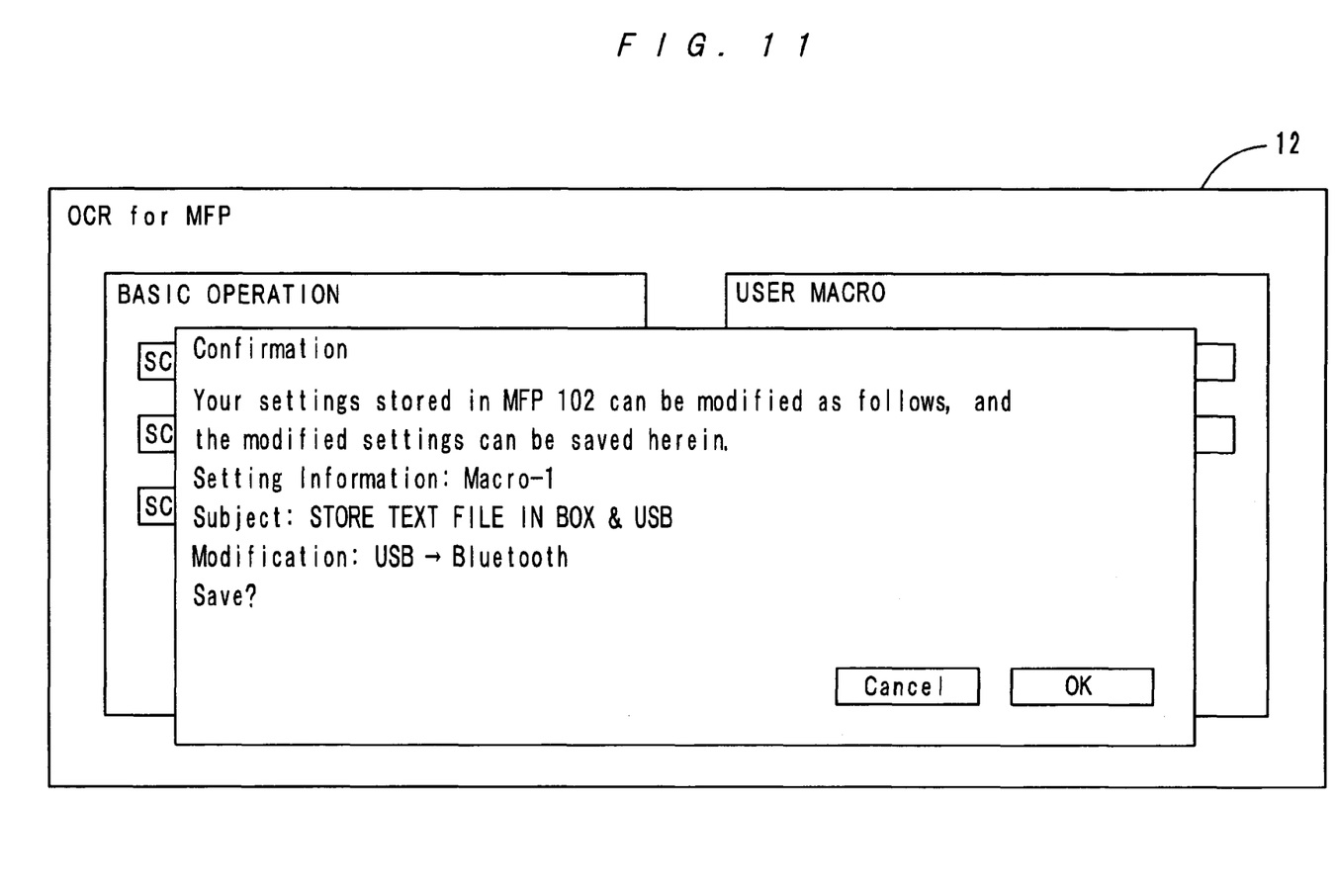
FIG. 11 is an exemplary confirmation screen.

After the modifications to the user's settings, the processing returns to FIG. 7, and in this embodiment, a confirmation screen to ask the user whether the modifications to the settings are to be saved (step S206). FIG. 11 is an example of the confirmation screen. When the "OK" button on the screen is pressed, it is judged that a command to save the modifications is made (YES at step S207), and the modified settings (macro instruction) are saved in the setting storage section 233 (step S208). When a command to save the modified settings is not made, for example, when the "CANCEL" button is pressed (NO at step S207), the modified settings are not saved.

Setting information may be sent from a plural number of MFPs, and modifications are made to all the setting information sent from the respective MFPs in the above-described way. In this embodiment, when there are no functional differences between the device which sends the setting information and the device which receives the setting information (NO at step S204), the setting information is stored in the setting storage section 233 with no modifications made thereto (step S208). However, when the setting information (macro instruction) includes the object of operation, the minimum necessary modification should be made.

After completing making modifications to all the setting information sent from the respective MFPs (YES at step S209), the procedure shown by FIG. 7 is completed, and the processing returns to the flowchart of FIG. 6. In the exemplary procedure shown by FIG. 6, modifications are made to the settings of all the users which have ever operated the MFP 101 (step S107). However, authentication of a user which logs in the MFP 101 may be made, and modifications may be made to the settings of only the user. In this case, when another user logs in after the installation of the program in the MFP 101, the MFP 101 receives setting information from other MFPs and carries out modifications to the user's settings in the above-described way.

Modifications

The present invention is not limited to the embodiment above, and the following modifications are possible.

Modification 1

In the embodiment above, an OCR program is installed in the MFP 101, and macro instructions are stored as setting information. However, the programs for operations in connection with image processing are not limited to OCR programs. The present invention is applicable to any program which can be carried out by an image processing apparatus and which permits users to make settings.

Modification 2

In the embodiment above, each user makes a macro instruction as his/her setting information. However, the setting information is not limited to a macro instruction and may be settings for user interface (for example, a way of displaying operation button on the display section 12).

Modification 3

In the embodiment above, the device information is exchanged among the MFPs beforehand, and each MFP has information on other MFPs in the device information management table 234. However, the system may be so structured that when a program for operations in connection with image processing is newly installed in an MFP, the MFP requests other MFPs for information on the individual devices.

Modification 4

The embodiment described above shows how to modify setting information when the device which sends setting information (MFP 102 in the embodiment above) has a function, while the device newly installed with a program (MFP 101 in the embodiment above) does not have the function. Specifically, as shown by FIG. 5, the MFP 102 has a USB interface, while the MFP 101 does not have a USB interface but has a Bluetooth interface, and "Send//USB" in the macro instruction is changed to "Send//Bluetooth". However, the modification to this part of macro instruction is not necessarily a substitution but may be an addition.

For example, if an OCR program is newly installed in the MFP 103 while macro instructions of individual users as shown by FIG. 8 are stored in the MFP 102, the macro instruction of a user may be modified so that a Bluetooth interface will be added as a data storage section because according to FIG. 5, the MFP 103 has both a USB interface and a Bluetooth interface.

Figure 12:
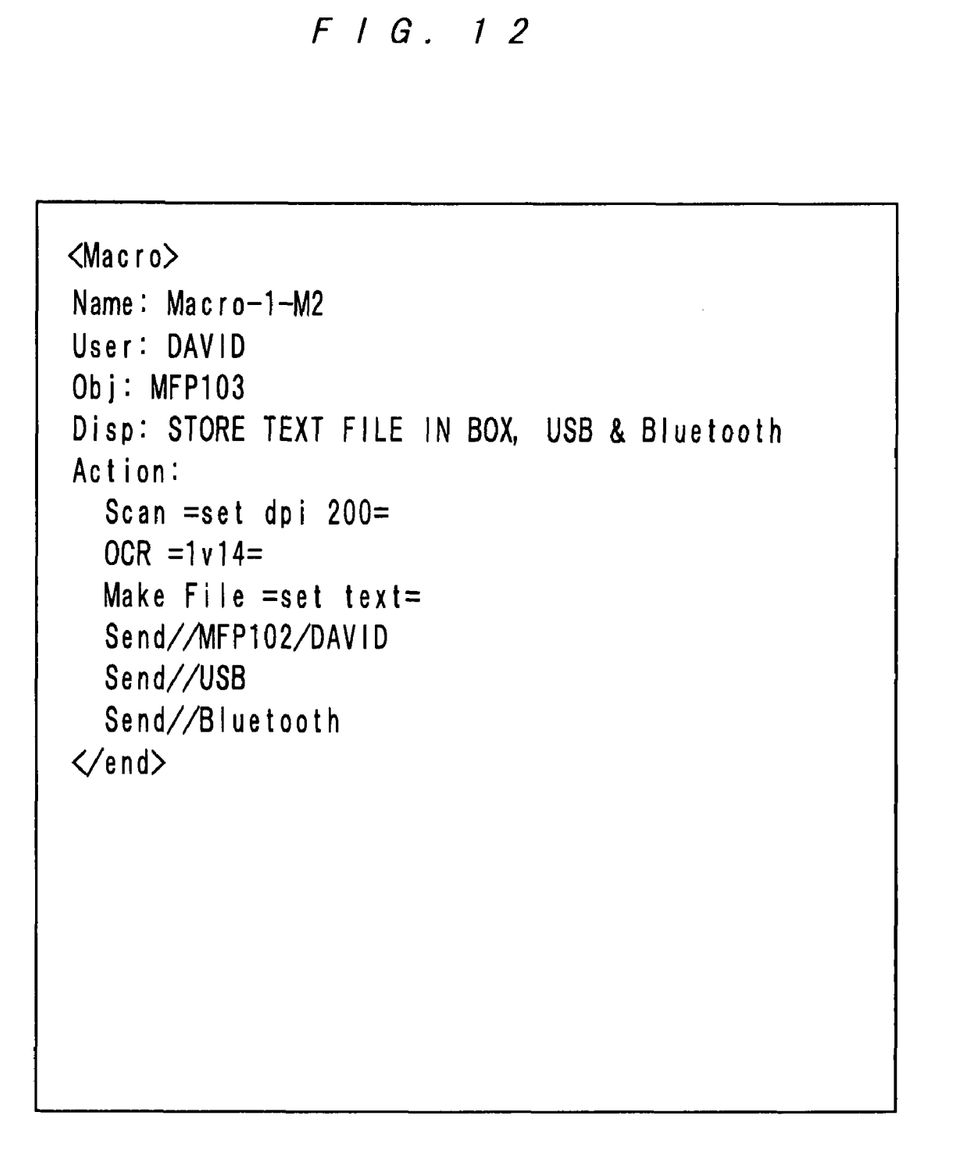
FIG. 12 is an illustration of a macro instruction with modifications made thereto by adding a data storage section.

FIG. 12 is an example of the macro instruction after an addition is made. In the item "Action", "Send//Bluetooth" is added after "Send//USB". In this case, for example at step S206, a confirmation screen may be displayed to confirm the user's opinion to add the data storage section. Also, a macro instruction modified by a substitution and a macro instruction modified by an addition may be separately stored.

Modification 5

In the embodiment above, the setting information (macro instruction) of a user includes the user's ID. However, which setting information is of which user may be managed by a table. For example, connections between files respectively stored with individual users' settings for user interface and the individual users may be recorded in a table.

Modification 6

In the embodiment above, the MFP 101 receives setting information of all users from other MFPs, including users not listed in the history information. However, the MFP 101 may designate user IDs when receiving setting information from other MFPs. For example, the MFP 101 may request the other MFPs for setting information of only users listed in the history information or for setting information of only the user who logs in. This arrangement permits a reduction in the volume of transmitted data.

Although the present invention has been described in connection with the preferred embodiments above, it is to be noted that various changes and modifications are possible to those who are skilled in the art. Such changes and modifications are to be understood as being within the scope of the invention.

What is claimed is:

1. An image processing system comprising a first image processing apparatus and a second image processing apparatus connected via a network, said image processing system comprising:
   a detecting section for detecting a program for operations in connection with image processing newly installed in said first image processing apparatus;
   an inquiry section for, when the detecting section detects a program for operations in connection with image processing installed in the first image processing apparatus, inquiring of the second image processing apparatus about whether the second image processing apparatus has the same program installed therein before; and
   a setting information transmission section for, when the second image processing apparatus has the same program installed therein before, transmitting information on individual users' settings for the program from the second image processing apparatus to the first image processing apparatus.

2. An image processing apparatus comprising:
   a detecting section for detecting a program for operations in connection with image processing newly installed in said image processing apparatus;
   an inquiry section for, when the detecting section detects a program for operations in connection with image processing newly installed in said image processing apparatus, inquiring of other image processing apparatuses connected to said image processing apparatus via a network about whether any of the image processing apparatuses connected to said image processing apparatus via the network has the same program installed therein before; and
   a setting information receiving section for, when a second image processing apparatus has the same program installed therein before, receiving information on individual users' settings for the program from the second image processing apparatus.

3. An image processing apparatus according to claim 2, wherein the information received by the setting information receiving section from the second image processing apparatus is information on settings of users which have ever operated said image processing apparatus.

4. An image processing apparatus according to claim 3, further comprising a history storage section stored with history information on users' operations of said image processing apparatus,
   wherein the setting information receiving section receives the information on settings of users which have ever operated said image processing apparatus from the second image processing apparatus, with reference to the history information.

5. An image processing apparatus according to claim 3, wherein the information received by the setting information receiving section from the second image processing apparatus is information on settings of a user which logs in said image processing apparatus.

6. An image processing apparatus according to claim 2, further comprising:
   a device information receiving section for receiving information on functions of said image processing apparatus and functions of the second image processing apparatus; and
   a judging section for judging from the information received by the device information receiving section whether there is a functional difference between said image processing apparatus and the second image processing apparatus.

7. An image processing apparatus according to claim 6, further comprising a modifying section for, when the judging section judges that there is a functional difference, making a modification to the information on individual users' settings with reference to the device information.

8. An image processing apparatus according to claim 7, further comprising a modification presenting section for presenting the modification made by the modifying section to a user.

9. An image processing apparatus according to claim 7, further comprising:
   an input receiving section for receiving an input from the user whether the modification made by the modifying section is to be saved; and
   a modified setting information storage section for, when the input receiving section receives an input to command saving of the modification, storing the modified information therein.

10. A non-transitory computer readable medium to be installed in an image processing apparatus with a processor, said non-transitory computer readable medium storing a software program causing said processor to execute processing comprising:
   a step of detecting a program for operations in connection with image processing newly installed in said image processing apparatus;
   a step of, when it is detected in the detecting step that a program for operations in connection with image processing is newly installed in said image processing apparatus, inquiring of other image processing apparatuses connected to said image processing apparatus via a network about whether any of the image processing apparatuses connected to said image processing apparatus via the network has the same program installed therein before; and
   a step of, when a second image processing apparatus has the same program installed therein before, requiring the second image processing apparatus for information on individual users' settings for the program.

* * * * *